(12) United States Patent
Jerhotova et al.

(10) Patent No.: US 8,928,476 B2
(45) Date of Patent: Jan. 6, 2015

(54) SYSTEM FOR ADVANCED SECURITY MANAGEMENT

(75) Inventors: Eva Jerhotova, Prague (CZ); Andrea Antonini, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 57 days.

(21) Appl. No.: 13/474,097

(22) Filed: May 17, 2012

(65) Prior Publication Data

US 2013/0307682 A1 Nov. 21, 2013

(51) Int. Cl.
*G08B 1/00* (2006.01)
(52) U.S. Cl.
USPC ......... 340/521; 340/506; 340/3.1; 340/539.1; 340/539.11

(58) Field of Classification Search
USPC .................. 340/506, 521, 3.1, 539.1, 539.11, 340/539.13
See application file for complete search history.

(56) References Cited

U.S. PATENT DOCUMENTS

| | | | |
|---|---|---|---|
| 5,400,246 A * | 3/1995 | Wilson et al. | 700/17 |
| 7,293,287 B2 | 11/2007 | Fischman et al. | |
| 7,571,474 B2 | 8/2009 | Ross et al. | |
| 7,631,354 B2 | 12/2009 | Ross et al. | |
| 7,937,760 B2 | 5/2011 | Ross et al. | |

* cited by examiner

*Primary Examiner* — Daryl Pope
(74) *Attorney, Agent, or Firm* — Schwegman Lundberg & Woessner, P.A.

(57) ABSTRACT

A system receives input from a plurality of sensors in a security management system. The input relates to two or more events. The input is stored in a database. A correlation between the two or more events is determined. A priority is dynamically assigned to the two or more events, and the correlation, the priority, and information relating to the two or more events are reported to a system user.

20 Claims, 6 Drawing Sheets

Dynamic Event Grouping & Interpretation via the ASEM Approach

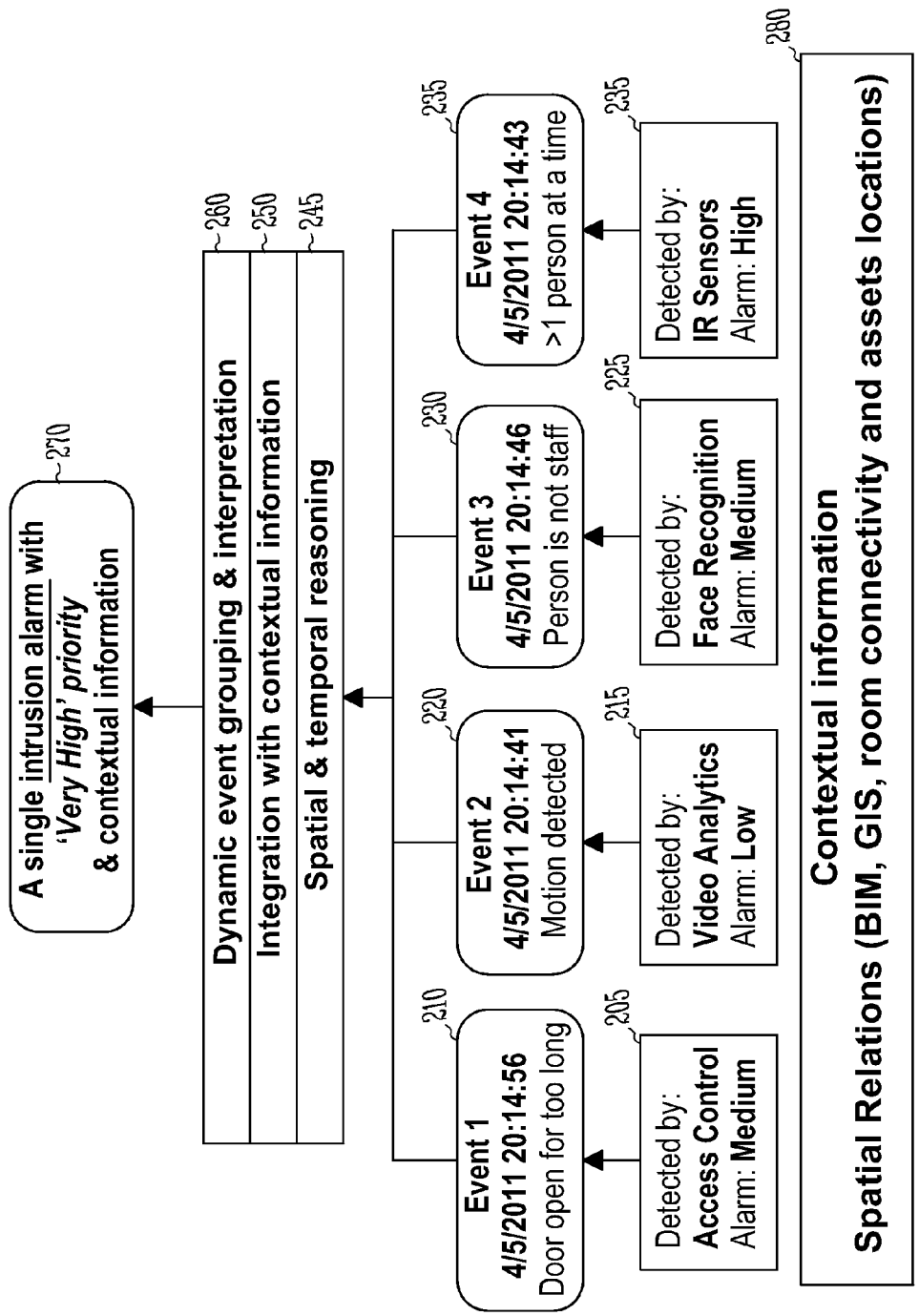

SYSTEM FOR ADVANCED SECURITY MANAGEMENT

TECHNICAL FIELD

The present disclosure relates to security management systems.

BACKGROUND

Security management (SM) systems identify potential security threats by gathering information from multiple sources (such as access control systems, intrusion detection systems, asset location systems, and video management systems) and presenting alerts, alarms of different priorities, or other information to an operator.

BRIEF DESCRIPTION OF THE DRAWINGS

FIG. 2 is a block diagram of an example use case for an Advanced Security Event Management (ASEM) system.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

As noted above, security management (SM) systems monitor security systems and provide information about the system and the monitored resources to security personnel or other system users. Current SM systems however are not designed to identify semantics and correlations between and among events that are detected by one or more security systems and emerge from a propagation of the same threat in space and time. As a result, an operator is provided with little support in understanding whether the detected abnormal events that are announced as alarms and alerts represent a real threat, what is the nature of this threat, and if there is only a single threat or multiple threats at a time. The process of understanding if and how the abnormal events relate to each other, and defining an appropriate response plan might therefore impose high cognitive load on the operator and negatively affect his or her performance. This problem is even more severe since security events are normally very rare, and hence an operator is not experienced in dealing with actual security events.

Additionally, in SM systems, an alarm priority is assigned to each alarm in order to help the operator prioritize his or her response steps. In current systems, the priority level of each alarm is fixed and does not adapt to the current contextual conditions (e.g., the time of day, the applied security level, or the concurrent alarms or alerts), and thus provides limited support to the operator in the task prioritization process.

Consequently, in an embodiment, an Advanced Security Event Management (ASEM) system supports a security operator's performance by correlating events for the operator and by providing dynamic event prioritization.

Figure 1:
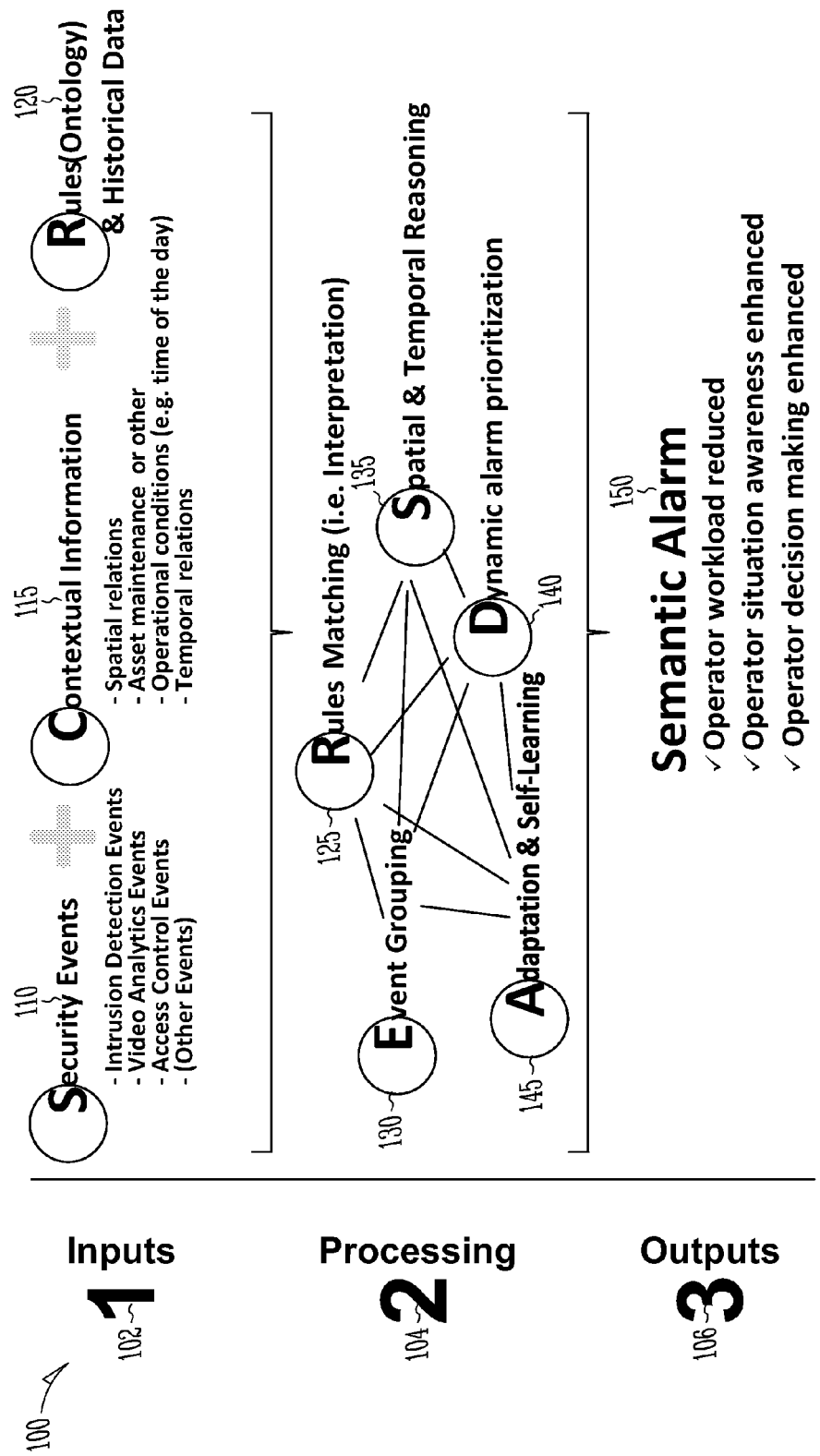
FIG. 1 is a block diagram of an embodiment of an Advanced Security Event Management (ASEM) system.

FIG. 1 illustrates a block diagram of an embodiment of an ASEM system 100. The ASEM system includes three modules and/or processors. There are also three levels within the ASEM system. There is an input level 102, a processing level 104, and an output level 106. The input level 102 includes a security events module 110, a contextual information module 115, and a rules (ontology) and historical data module 120. The security events module 110 processes intrusion detection events, video analytics events, access control events, and other security related events. An example of an intrusion detection event that would generate a security event is a door that remains open for more than a particular amount of time, for example, 15 seconds. The contextual information module 115 processes spatial relations between and among events, asset maintenance information, and operational conditions (e.g., time of day, weekday, or holiday), and the actual values of variables from various systems. The rules and historical data 120 is a database of the data previously collected by the ASEM system and the rules that the ASEM system uses to correlate and prioritize security events.

The data and analysis from the input level 102 is transmitted to the processing level 104. The processing level 104 includes a rules matching module 125, an event grouping module 130, a spatial and temporal reasoning module 135, a dynamic alarm prioritization module 140, and an adaptation and self-learning module 145. The rules matching module 125 determines whether the currently detected temporally and spatially related events match any of the predefined rules. The event grouping module 130 groups a plurality of events together. For example, particular sensors/events may be grouped together because they are in the same section of a building, and/or such events could be grouped together because while they are not in the same section of the building, the events occur in such close time proximity that they should be grouped together. As indicated by FIG. 1, the event grouping module 130 interacts with the spatial and temporal reasoning module 135. The spatial and temporal reasoning module 135 can include a sequential pattern mining method and a spatial reasoning method. The adaptation and self learning module 145 adjusts the system over time based on past experiences. Self learning and adaptation may be initiated either by the system itself or by the user (e.g., to refine rules in case the system produces a false alarm, when there are changes in sensor placement, etc.) The adaption and self learning module 145 is based on heuristic rules, domain ontology, historical data, and Security Risk Assessment (SRA) analysis for an interpretation of the identified security event patterns. SRA is a subject matter expert group session identifying realistic security events, their potential causes and consequences, as well as their likelihood of occurrence and severity of consequences. The combination of likelihood and severity determine the risk that is associated to a specific event. Typically, an SRA is a semi-structured method. In the context of the ASEM tool, the SRAs will identify the list of all possibly foreseeable security events to feed the ontology. For example, a prior security event may have occurred when the previously mentioned door was open for 10 seconds. Consequently, the system can be altered such that in the future if that door remains open for more than 10 seconds that will be treated as a security event. The dynamic alarm prioritization module 140 examines the processing of the rules matching module 125, the event grouping module 130, the spatial and temporal reasoning module 135, and the adaptation and learning module 145 to prioritize a grouping of several security system events. For example, the prioritization module 140 includes a method for condition-based alarm prioritization that is based on the identified contextual conditions 115, such as concurrent alarms or other relevant information. In this way, the prioritization module 140 exploits the results of event pattern recognition and interpretation and allows for dynamic and adaptive alarm priority settings. If the processing level 104 determines that there is a security event among the grouping of events generated by security systems, then the output level 106 will output a semantic alarm 150. The semantic alarm 150 has several advantages, such as a reduction in operator workload, an enhancement of the operator's situation awareness, and an enhancement of the operator's decision making capability.

The ASEM system allows extracting semantics from apparently uncorrelated (i.e. independent) security events recorded via different sources, and displaying their hidden relationships (e.g., causal) to the security operator in a meaningful, usable, and workload-reducing way. While a pattern mining and security risk analysis (SRA) could possibly prove to be sufficient for determining both the rules and the self-learning algorithm in an embodiment, there may be some concerns and considerations. For example, there may be a concern regarding the scarcity and sparseness of historical data on which the pattern mining algorithm is applied. In other words, it is unlikely that the same type of event could be captured twice in the historical data as security events are normally somewhat rare. Also, the intrinsic non-exhaustive nature of SRA, as it is based on semi-structured group sessions with subject matter experts, tends to empower those methodologies for resolving the complexity of the matter.

In another embodiment, a specific domain ontology is embedded into the ASEM system. Specifically, the ontology is automatically developed from text derived from different sources (e.g., procedures, historical data, working methods, SRAs). The ontology includes a set of foreseeable security events that are described in textual natural language. It therefore provides a semantics taxonomy of identified security events including some basic relationships among them (e.g., is_a ; is_a_type_of, and semantics proximity).

The resulting ontology can be validated by security experts before it is implemented in the rules engine 125. The ontology is automatically updated in real-time upon occurrence of specific security events to be recorded as natural language text. The same ontology-from-text automated mechanism that extracts the semantics inherent to each of those events applies. The ontology is expanded by introducing inferential rules allowing the system to automatically derive hidden semantic relationships among events that are yet to be included in the ontology. The ontology is automatically updated by spatial and temporal analysis and other contextual data (e.g., the actual values of variables from various systems—mainly the values that produced the respective alarm events). The ontology is manually expanded on-the-fly by the user via an 'update model' mechanism.

In online operations, the system identifies correlations among security events, derives the underlying semantic information, and subsequently announces the semantic alarm and the group of individual correlated alarms to the operator. The priority of the semantic alarm is determined by integrating the severity of the threat, the value of the pattern match measure, and the priorities allocated to the single alarm events constituting the pattern.

In an embodiment, an ASEM system can be used as an additional module in an existing security management system. Where available, the ASEM concept leverages the spatial information provided by BIM and/or a model based on GIS (geographical information system). However, the ASEM system can also function independently by setting up the spatial model, for instance, based on system tag naming conventions. The use of an ASEM system removes from an operator the cognitive task of relating apparently independent alarms, decreasing the perceived operator workload, enhancing situation awareness, and enhancing decision making in dealing with security threats. Additionally, in an embodiment, automatic extraction of semantics from patterns allows for designing of a Threat Response Guidance (TRG) that may be presented to the operator for supporting a safe, an accurate, and an efficient threat response. A TRG supports an operator in dealing with the specific security event, for example by automatically recalling on the user interface the procedure applicable for the event, and automatically initiating specific safeguards (e.g., lock of doors in specific areas).

FIG. 2 illustrates an example of a use case for an ASEM application. Within a limited timeframe, a number of security systems (e.g., access control 205, video analytics 215, face recognition 225, and persons counting systems 235) separately detect apparently independent security events (e.g., door opened for too long 210, motion detected 220, person is not staff 230, and more than one person in a designated area 240, respectively). Each of these events is then associated to a specific alarm priority. These security systems 205, 215, 225, and 235 can use contextual information 280, a building information model 285, geographical information systems 290, or some other form of spatial reasoning model. The ASEM system automatically discovers correlations between the events and integrates them into a meaningful pattern using contextual information 250 (and BIM model 285), spatial and temporal reasoning 245, and dynamic event grouping and interpretation 260. The ASEM system then provides the operator with a single alarm of higher priority that the ones associated to each single event at 270.

Figure 3A:
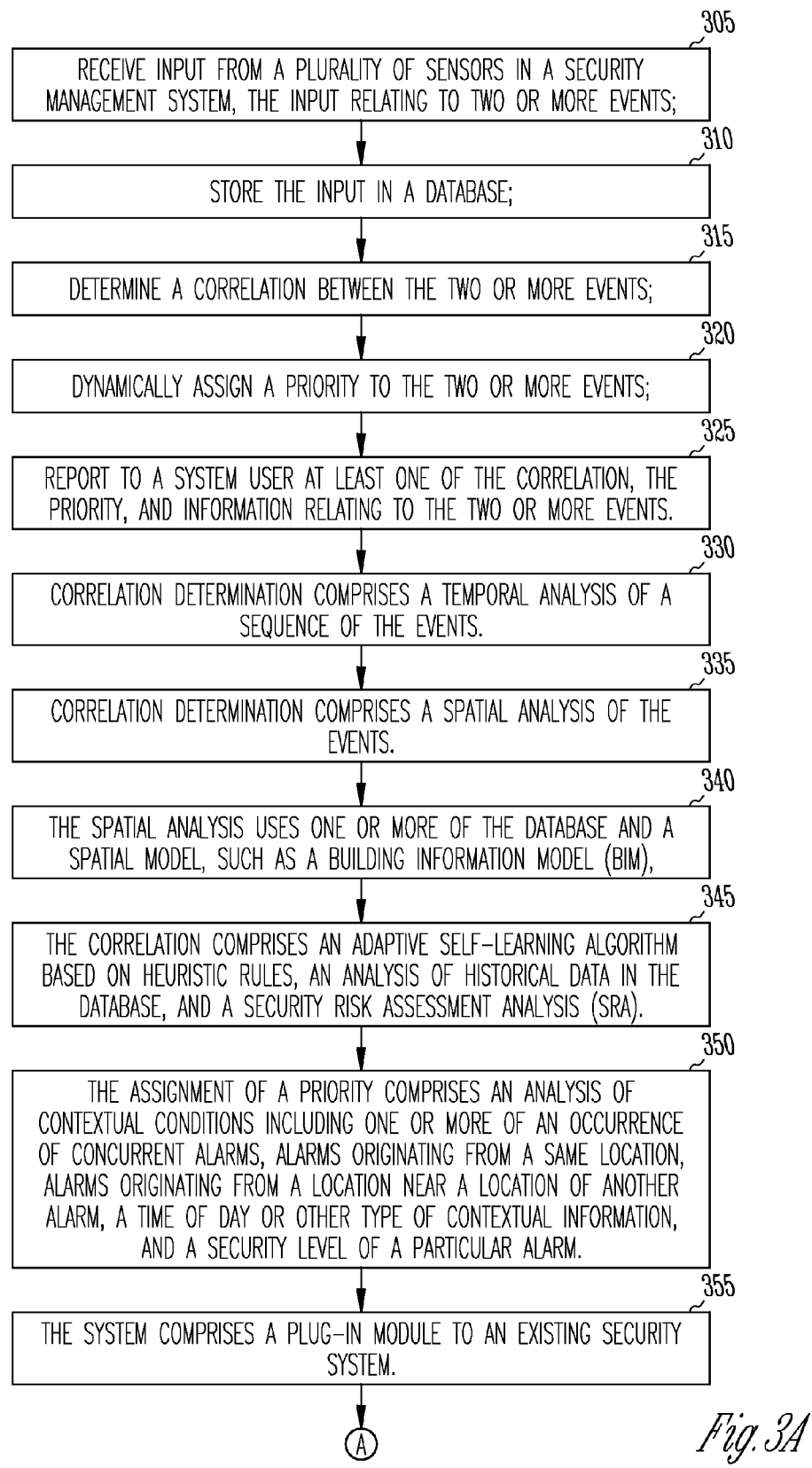
FIGS. 3A and 3B are a diagram illustrating the features of an embodiment of an Advanced Security Event Management (ASEM) system.
Figure 3B:
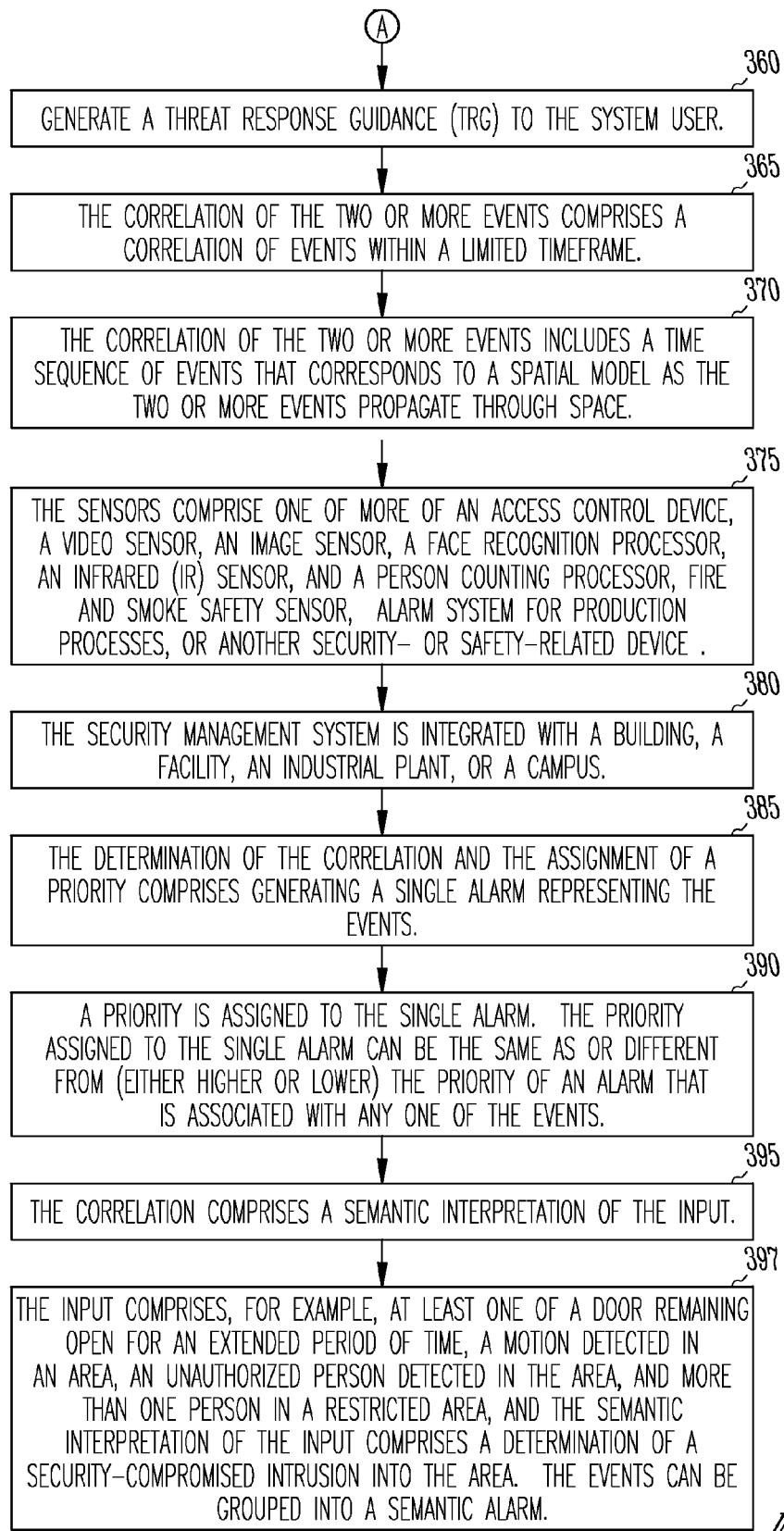
Figure 4:
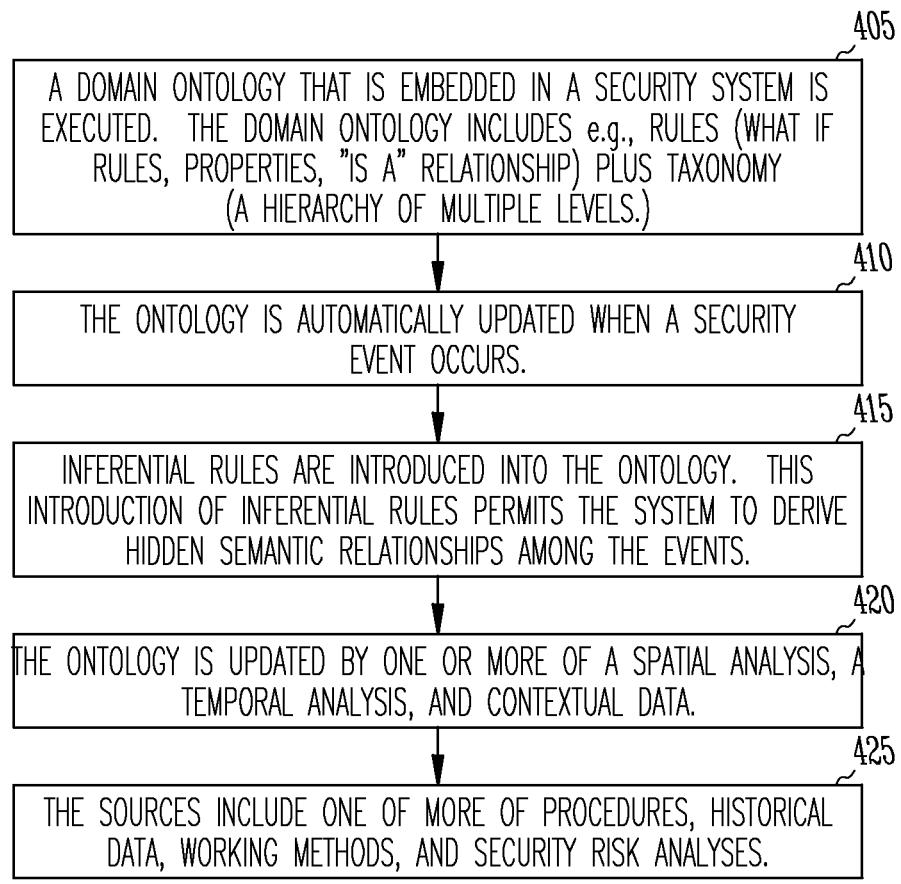
FIG. 4 is a diagram illustrating the features of another embodiment of an Advanced Security Event Management (ASEM) system.

FIGS. 3A, 3B, and 4 are flowchart-like diagrams illustrating features of an Advanced Security Event Management system. FIGS. 3A, 3B, and 4 include a number of process blocks 305-397 and 405-425. Though arranged serially in the example of FIGS. 3A, 3B, and 4, other examples may reorder the blocks, omit one or more blocks, and/or execute two or more blocks in parallel using multiple processors or a single processor organized as two or more virtual machines or subprocessors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 3A and 3B, at 305, input is received into a computer processor from a plurality of sensors in a security management system. The input relates to two or more security events. At 310, the input is stored into a database. At 315, a correlation between the two or more events is determined, and at 320, a priority is dynamically assigned to the two or more events. At 325, at least one of the correlation, the priority, and information relating to the two or more events is reported to a system user.

At 330, the correlation determination includes a temporal analysis of a sequence of the events. At 335, the correlation determination includes a spatial analysis of the events. At 340, the spatial analysis uses one or more of a database, a building information model (BIM), a geographical information system (GIS) based model, and a room connectivity model including sensor locations based on system tag naming conventions.

At 345, the correlation comprises an adaptive self-learning algorithm based on heuristic rules, an analysis of historical data in the database, and a security risk assessment analysis (SRA). At 350, the assignment of a priority includes an analysis of contextual conditions including one or more of an occurrence of concurrent alarms, alarms originating from a same location, alarms originating from a location near a location of another alarm, a time of day, and indication that it is a weekday indication, an indication that it is a holiday, and a security level of a particular alarm.

At 355, the system is a plug-in module to an existing security system. At 360, the system generates a threat response guidance (TRG) to the system user. At 365, the correlation of the two or more events comprises a correlation of events within a limited timeframe, and at 370, the correlation of the two or more events includes a time sequence of events that corresponds to a spatial model as the two or more events propagate through space. The amount of time in the limited time frame depends on each security situation, and it is within the ability of one of skill in the art to determine the amount of time in this limited time frame. In general, such a limited time frame can range from a few seconds to an hour or more.

At 375, the sensors include one or more of an access control device, a video sensor, an image sensor, a face recognition processor, an infrared (IR) sensor, a person counting processor, a fire sensor, a smoke sensor, and an alarm system for production processes. At 380, the security management system is integrated with a building, a facility, an industrial plant, or a campus. At 385, the determination of the correlation and the assignment of a priority include generating a single alarm representing the events, and at 390, a priority is assigned to the single alarm. The priority assigned to the single alarm can be the same as or different from (either higher or lower) the priority of an alarm that is associated with any one of the events. If the events could be a true security breach, the assigned priority would be higher than the priority of any individual event. If the events do not indicate a security event, then the assigned priority could actually be lower than the priority assigned to any of the individual events. For example, if there is a maintenance situation, a door may be opened for long periods of time, or many persons could be entering an area. These known maintenance situations would cause an assignment of a lower priority. Additionally, in an online environment, a semantic/group alarm is displayed to an operator. However, the operator is also allowed to view the individual alarm events constituting the semantic alarm. Furthermore, the operator is provided with visualization of the spatial and temporal locations of the individual alarm events and can also view the ontological rules that generated the semantic alarm.

At 395, the correlation includes a semantic interpretation of the input. At 397, the input includes, for example, a door remaining open for an extended period of time, a motion detected in an area, an unauthorized person detected in the area, and more than one person in a restricted area, and the semantic interpretation of the input comprises a determination of a security-compromised intrusion into the area. The events can also be grouped into a semantic alarm. As noted, these are only examples, and many other security events could be recognized in a particular system.

Referring to FIG. 4, at 405, a domain ontology that is embedded in a security system is executed. The domain ontology includes rules (what-if rules, properties, "is a" relationship) plus a taxonomy (a hierarchy of multiple levels). That is, "rules" refer to ontology or ontological rules. The domain ontology may be derived from text that is from a plurality of sources and includes a set of predicted security events that are described in a natural language. More specifically, ontology in the ASEM system can include a computer program coded in many different ways. At 410, the ontology is automatically updated when a security event occurs. At 415, inferential rules are introduced into the ontology. This introduction of inferential rules permits the system to derive hidden semantic relationships among the events. At 420, the ontology is updated by one or more of a spatial analysis, a temporal analysis, and contextual data. At 425, the sources include one of more of procedures, historical data, working methods, and security risk analyses.

Figure 5:
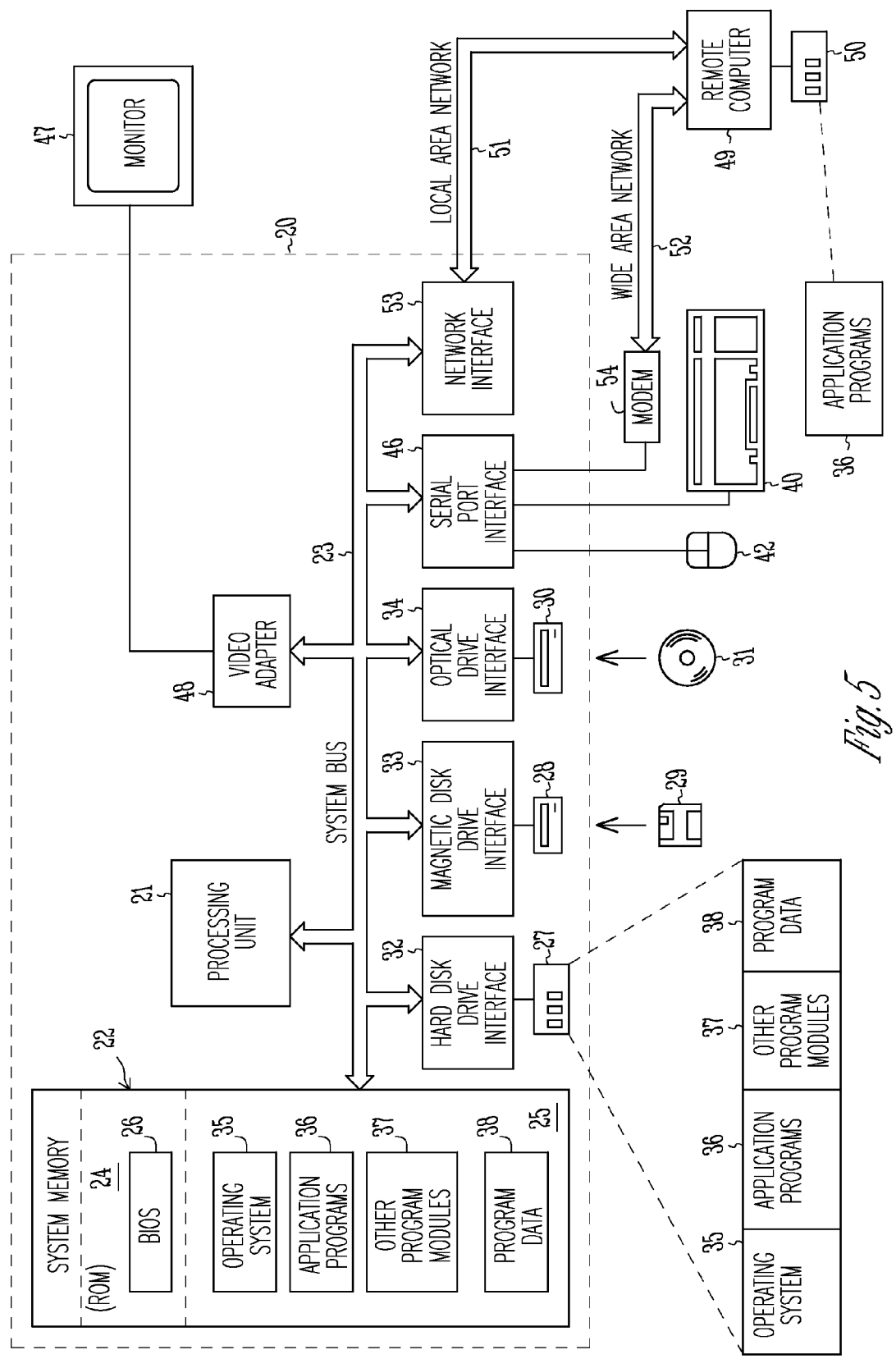
FIG. 5 is a block diagram of a computer processing system that can be used in connection with an Advanced Security Event Management (ASEM) system.

FIG. 5 is an overview diagram of hardware and an operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a computer processor and computer storage device configured to:
   receive input from a plurality of sensors in a security management system, the input relating to two or more events;
   store the input in a database;
   determine a correlation between the two or more events;
   dynamically assign a priority to the two or more events; and
   report to a system user the correlation, the priority, and information relating to the two or more events.

2. The system of claim 1, wherein the correlation determination comprises a temporal analysis of a sequence of the events.

3. The system of claim 1, wherein the correlation determination comprises a spatial analysis of the events.

4. The system of claim 3, wherein the spatial analysis uses the database, a building information model (BIM), a geographical information system (GIS) based model, and a room connectivity model including sensor locations based on system tag naming conventions.

5. The system of claim 1, wherein the correlation comprises an adaptive self-learning algorithm based on heuristic rules, an analysis of historical data in the database, and a security risk assessment analysis (SRA).

6. The system of claim 1, wherein the assignment of a priority comprises an analysis of contextual conditions including an occurrence of concurrent alarms, alarms originating from a same location, alarms originating from a location near a location of another alarm, a time of day, a weekday indication, a holiday indication, and a security level of a particular alarm.

7. The system of claim 1, wherein the system comprises a plug-in module to an existing security system.

8. The system of claim 1, wherein the processor is configured to generate a threat response guidance (TRG) to the system user.

9. The system of claim 1, wherein the correlation of the two or more events comprises a correlation of events within a limited timeframe.

10. The system of claim 9, wherein the correlation of the two or more events comprises a time sequence of events that correspond to a spatial model as the two or more events propagate through space.

11. The system of claim 1, wherein the sensors comprise one or more of an access control device, a video sensor, an image sensor, a face recognition processor, an infrared (IR) sensor, a person counting processor, a fire sensor, a smoke sensor, and an alarm system for production processes.

12. The system of claim 1, wherein the security management system is integrated with a building, a facility, an industrial plant, or a campus.

13. The system of claim 1, wherein the determination of the correlation and the assignment of a priority comprises generating a single alarm representing the events.

14. The system of claim 13, wherein the computer processor is configured to assign a priority to the single alarm; and wherein the priority assigned to the single alarm is the same as or different from the priority of an alarm that is associated with any one of the events.

15. The system of claim 1, wherein the correlation comprises a semantic interpretation of the input.

16. The system of claim 15, wherein the input comprises at least one of a door remaining open for an extended period of time, a motion detected in an area, an unauthorized person detected in the area, and more than one person detected in a restricted area, and the semantic interpretation of the input comprises a determination of a security-compromised intrusion into the area.

17. A system comprising:
a computer processor and a computer storage device configured to:
execute a domain ontology that is embedded in a security system, the domain ontology comprising text derived from a plurality of sources and comprising a set of predicted security events that are described in a natural language;
automatically update the ontology when an actual security event occurs;
introduce inferential rules into the ontology, thereby permitting the system to derive hidden semantic relationships among the actual security events; and
update the ontology by one or more of a spatial analysis, a temporal analysis, and contextual data.

18. The system of claim 17, wherein the sources comprise one of more of procedures, historical data, working methods, and security risk analyses.

19. A computer readable medium comprising instructions that when executed by a processor execute a process comprising:
receiving input from a plurality of sensors in a security management system, the input relating to two or more events;
storing the input in a database;
determining a correlation between the two or more events;
dynamically assigning a priority to the two or more events; and
reporting to a system user the correlation, the priority, and information relating to the two or more events.

20. The computer readable medium of claim 19, wherein the correlation determination comprises one or more of a temporal analysis of a sequence of the events and a spatial analysis of the events; and wherein the spatial analysis uses one or more of the database, a building information model (BIM), a geographical information system (GIS) based model, and a room connectivity model including sensor locations based on system tag naming conventions.

* * * * *